INVENTORS:
JAMES C. MUNDAY,
JUNIUS B. NEALE,
BY Nathan J. Cornfeld
THEIR ATTORNEY.

INVENTORS:
JAMES C. MUNDAY,
JUNIUS B. NEALE,

BY *Nathan Tompkins*
THEIR ATTORNEY.

United States Patent Office 3,422,514
Patented Jan. 21, 1969

3,422,514
APPARATUS FOR MANUFACTURING ALIGNED-GRIDS ELECTRON DISCHARGE DEVICE
James C. Munday and Junius B. Neale, Owensboro, Ky., assignors to General Electric Company, a corporation of New York
Original application Oct. 14, 1963, Ser. No. 315,920, now Patent No. 3,364,379, dated Jan. 16, 1968. Divided and this application May 15, 1967, Ser. No. 649,401
U.S. Cl. 29—25.19         3 Claims
Int. Cl. H01j 9/02

ABSTRACT OF THE DISCLOSURE

A method and apparatus for aligning and mounting grid electrodes of an aligned-grids electron discharge device is provided in which support rods of the first and second grid electrodes are preliminarily positioned on a reference plate, one of the grid electrodes is then displaced relative to the other by movement of its associated support rods, and thereafter the support rods of each of the grids are deformed to provide integral projections thereon overlying both the top and bottom surfaces of a plate supporting the rods and in contiguous relation with such surfaces.

Figure 1:
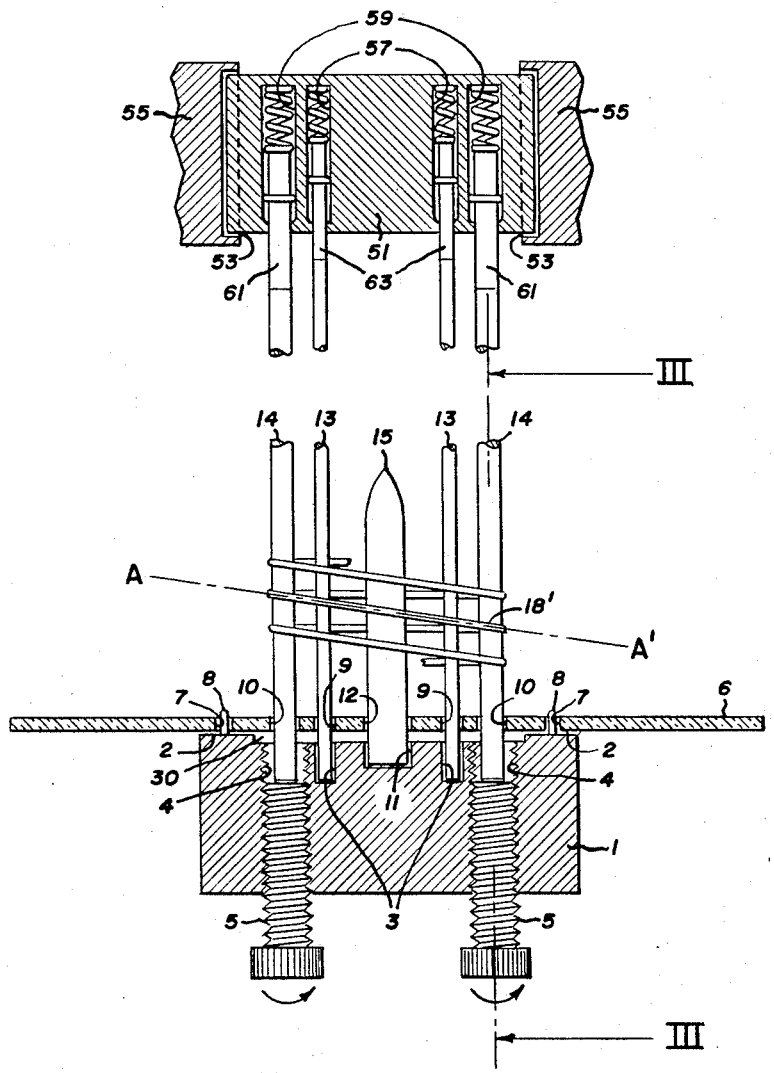

This application is a division of our application, Ser. No. 315,920, filed Oct. 14, 1963, entitled "Aligned-Grids Electron Discharge Device and Method and Apparatus for Manufacture Thereof," now Patent No. 3,364,379, patented Jan. 16, 1968.

This invention relates to aligned-grids electron discharge devices, and more particularly to such devices and grids thereof. The invention relates further to a method of, and apparatus for, aligning and mounting grid electrodes in the manufacture of an aligned-grids electron discharge device.

In an aligned grids electron discharge device, two or more grid electrodes are positioned in the path of electron flow between the cathode, or electron-emitting electrode, and the anode, or electron-receiving, electrode. The grid electrodes are frequently of the type in which a helix of wire is wound about a pair of parallel support rods and fastened thereto by some suitable technique, such as by welding, or by cutting and swaging of the support rods. The grids thus constructed provides a plurality of parallel lateral wires, vertically displaced in accordance with a predetermined pattern and extending between the support rods, the lateral wires being positioned in a direction generally transverse to the path of electron flow from the cathode to the anode.

An electron discharge device employing a plurality of grid electrodes usually is constructed with the grid electrodes positioned intermediate the cathode and the anode electrodes, such as in a tetrode. In a tetrode, there usually is provided a generally rectangular-shaped cathode centrally located and vertically disposed within the device, the cathode being surrounded by a control grid electrode which, in turn, is surrounded by a screen grid electrode, the plane of the lateral wires of the grid electrodes being substantially parallel to the major surfaces of the cathode.

In addition, an anode is positioned in a vertical plane surrounding the outermost grid electrode and generally parallel to both the lateral wires and the cathode major surfaces. Relative to the cathode potential, the control grid electrode generally is biased to a slightly negative potential and the screen grid electrode generally is biased to an equal, or more positive, potential. Therefore, the screen grid, if directly interposed in the path of electron flow, has a tendency to absorb the impinging electrons of the electron flow with the resultant creation of an undesirable current therein.

One of the most effective ways to shield certain grid electrodes, such as the screen grid electrode, from the electron flow, is to align the lateral wires of such grid electrodes with the corresponding lateral wires of the grid electrode closer to the cathode, the latter in some cases being the control grid electrode, although in pentodes or other multi-grid tubes the aligned grids can be any pair of grids, as desired. In this manner, the lateral wires of the electrodes intermediate the cathode and the anode will lie in a common alignment plane parallel to the path of electron flow and thus in the shadow of the corresponding lateral wires closer to the cathode.

Various techniques have been practiced heretofore for mounting and aligning grid electrodes in the manufacture of aligned-grids electron discharge devices. Frequently, electrodes of the device are mounted vertically on a horizontally disposed insulating support member, commonly a mica plate. A second insulating support plate, similar to the first, is positioned in parallel relation therewith and vertically displaced therefrom for connection to the opposite ends of one or more of the electrodes.

In one known arrangement for mounting a plurality of grids in aligned relation on an insulating support plate, indexing projections are formed on the opposite ends of the support rods and the lateral wires are wound onto the support rods from a point located a measured distance from the indexing projections adjacent one end of the support rods. The grid electrodes are mounted on the support plate by inserting the support rods into apertures provided therefor in the insulating support plate, the insulating support plate providing a common base or plane against which the indexing projections abut to assure alignment of the corresponding lateral wires of the plurality of grid electrodes. The other ends of the support rods are positioned within apertures provided in the second insulating support plate, the indexing notches at the other ends abutting the second insulating plate. An anode is mechanically joined to both of the support plates, the support plates thereby being fixed to secure the grid electrodes therebetween.

In this technique, manufacturing tolerances must be extremely exact to provide the alignment required. Further, in operation of the electron discharge device, the grid electrodes become heated and consequently tend to expand. The abutting relation of the indexing notches or projections with the support plates, however, prevents axial expansion of the support rods. The force created by the heating, therefore, tends to bow the support rods in a lateral or horizontal direction with consequent distortion and misalignment of the grid electrodes.

Alternative prior art mounting techniques, such as welding of the support rods to metal clips provided in the support plates, are also unsatisfactory due to the undesirable heating of the grid electrodes caused by the welding, the heating again effecting distortion and misalignment of the lateral wires.

It is, therefore, an object of this invention to provide a method of and apparatus for aligning and mounting the grid electrodes of an aligned grids electron discharge device in a precise, but simple an deconomical, fashion.

It is still another object of this invention to provide a grid mounting structure for an aligned-grids electron discharge device having improved structural characteristics.

It is still a further object of this invention to provide a mounting structure for an aligned-grids electron discharge device in which the grid electrodes remain in alignment and undistorted by temperature variations.

Further objects of this invention will become apparent as the following description proceeds and the features of novelty of this invention will be pointed out with particularity in the claims which are annexed to and which form a part of this specification.

In accordance with this invention, the vertical support rods of first and second grid electrodes are positioned within apertures provided in a generally horizontal insulating support plate, the support rods extending beyond the top and the bottom surfaces of the support plate. To align the corresponding lateral wires of the grid electrodes, one of the grid electrodes is displaced vertically relative to the other grid electrodes by moving its associated support rods in a direction generally transverse to the plane of the support plate. Following the alignment, the support rods are deformed to provide integral projections on the support rods overlying both the top and the bottom surfaces of the support plate in contiguous relation therewith. The integral projections thus serve to mount securely the support rods on the insulating support plate and to maintain accurately in alignment the corresponding lateral wires of the plurality of grid electrodes. A second insulating support plate is positioned in parallel relation with the first insulating support plate and vertically displaced therefrom, the second insulating support plate being provided with a plurality of apertures therein through which the opposite ends of the support rods snugly, yet freely, extend. The first and second insulating support plates are joined mechanically, as by an anode electrode which extends therebetween and is joined to both of the insulating support plates.

Figure 2:
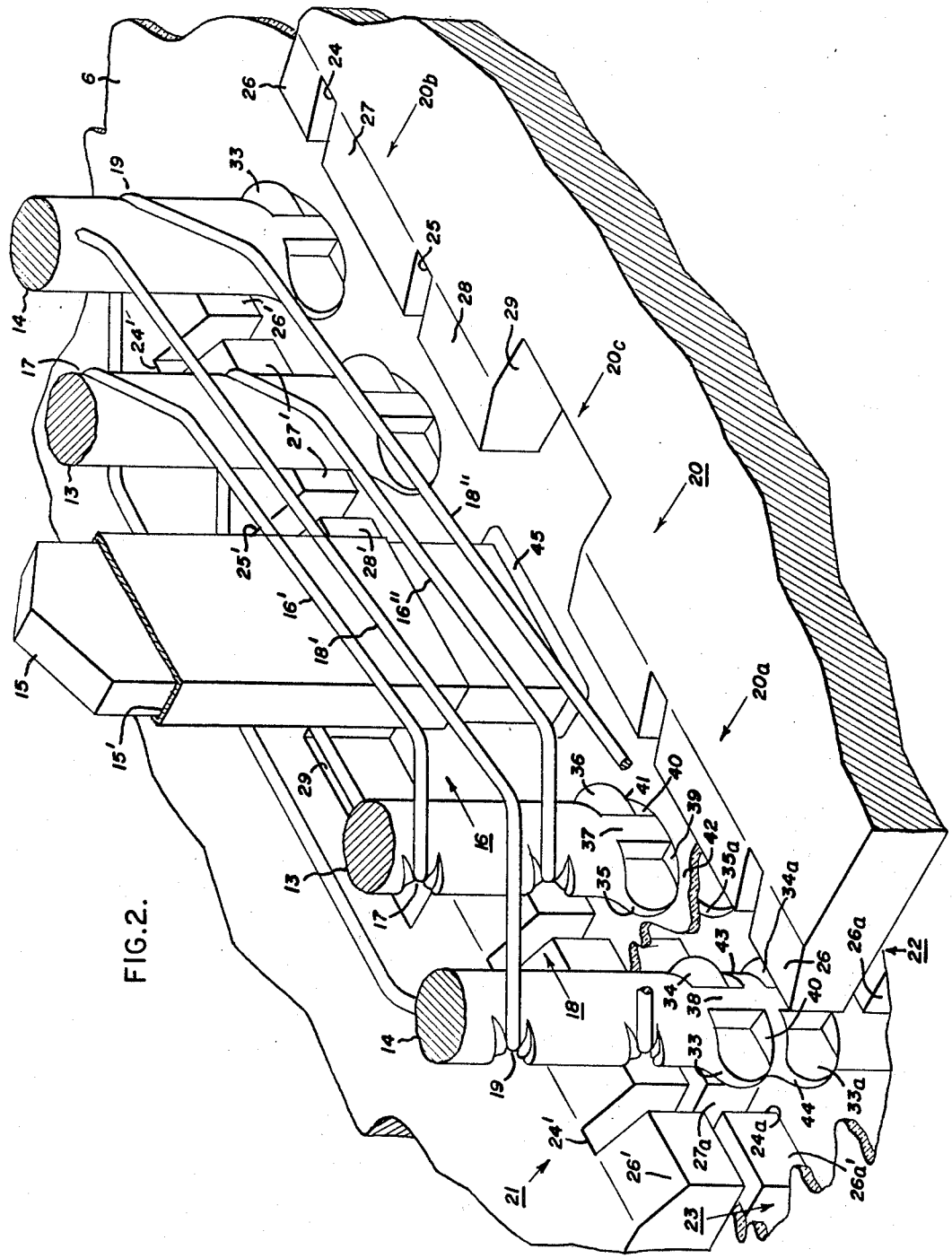
Figure 3:
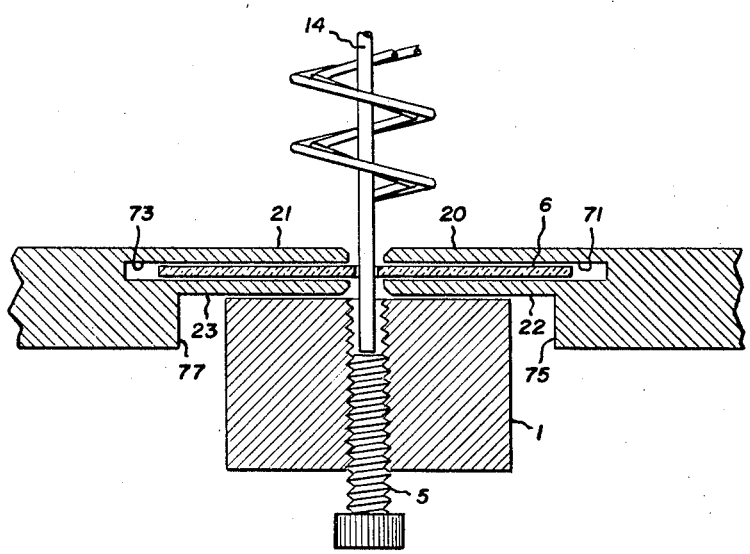
Figure 4:
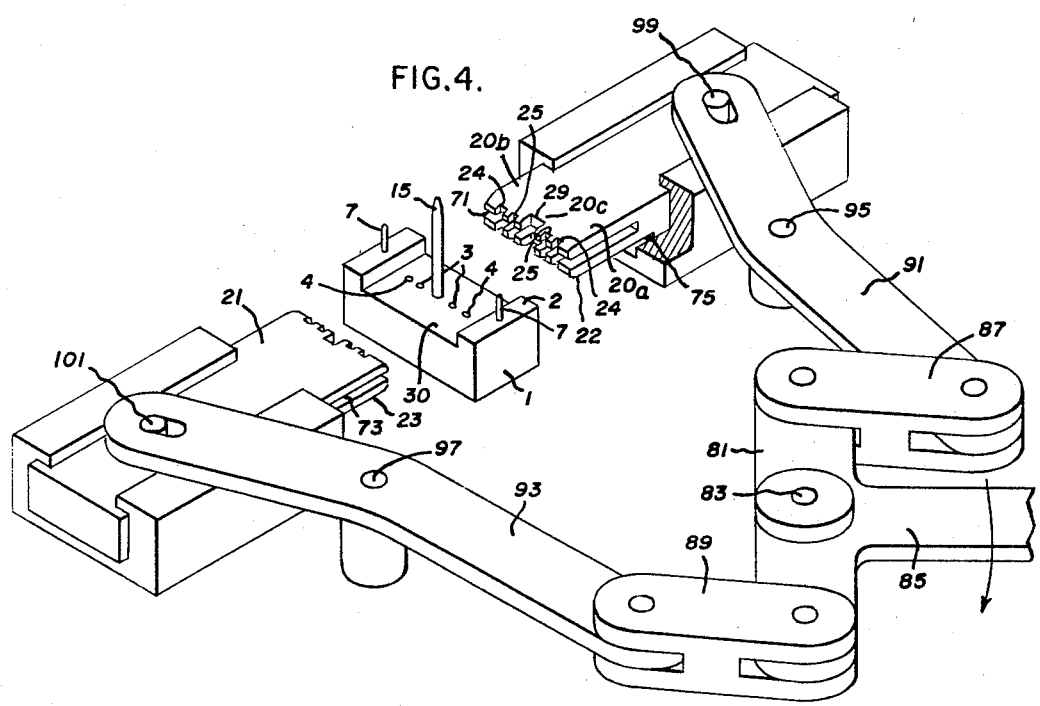
Figure 5:
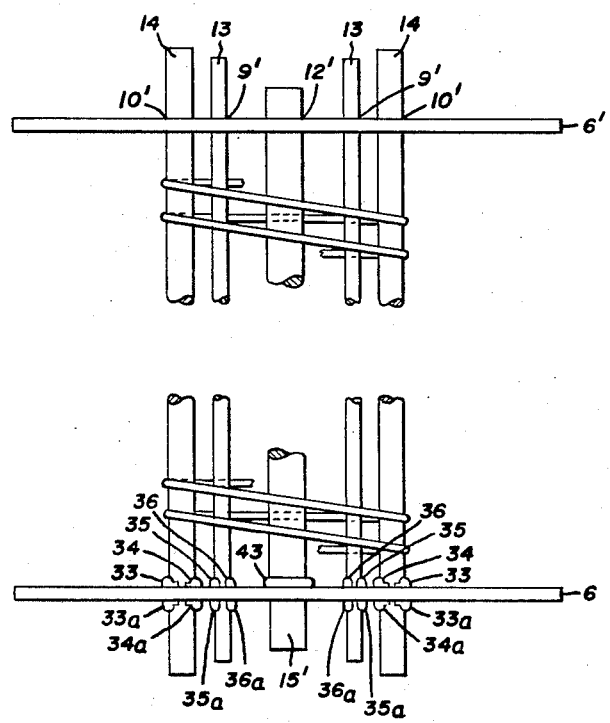

For an understanding of the invention, reference may be had to the following detailed description and drawings of one illustrative embodiment of the apparatus of the invention and the completed structure produced in the practice of the method and by the operation of the apparatus of the invention, in which:

FIG. 1 is a fragmentary side elevational view, partially broken away, showing the grid electrodes as initially positioned and supported by the electrode mounting apparatus of the invention, FIG. 2 is a perspective view, partially broken away, showing the deforming means and the integral projections formed of the support rods of the grid electrodes by the deforming means, FIG. 3 is a view, partially broken away, taken along the line III—III, in the direction of the arrows of FIG. 1 showing the electrode elements as initially positioned and supported by the electrode mounting apparatus of the invention and the deforming means of the invention, FIG. 4 is a fragmentary perspective view of a detail of our apparatus, and FIG. 5 is a side elevational view of the aligned grids mounted in accordance with this invention.

In FIG. 1, there is shown base member 1 of the electrode mounting apparatus of the invention. The base is preferably a block of metal or other suitable material, and extending in a vertical direction through the horizontal mounting surface 2 of, and into the base member 1 are a pair of recesses 3 and a pair of threaded apertures 4, the threaded apertures 4 having screw members 5 received therein, The screws 5 are manually operable from the underside of the base 1. A support plate 6, formed of insulating material, such as mica or the like, is held in horizontal position on the mounting surface 2 of the base member 1 and maintained in an aligned position thereon by lugs 7 on the base member 1 which extend through apertures 8 in the support plate 6.

The support plate 6 further is provided with a first pair of apertures 9 and a second pair of apertures 10, the apertures 9 and 10 being arranged for alignment with the pair of recesses 3 and the pair of threaded apertures 4, respectively. In addition, there is provided an aperture 11 in the base member 1 and an aperture 12 in the support plate 6, the aperture 12 being aligned with the recess 11.

In the perspective view of FIG. 2, there is shown a portion of the support plate 6 and portions of a first pair of parallel vertical support rods 13 and a second pair of parallel vertical support rods 14. A guide 15 is shown over which is positioned a cathode sleeve 15'. A grid electrode 16, formed on the support rods 13 in a prior manufacturing step, is supported by the support rods 13. The grid electrode 16 conveniently may be formed by winding a helix of wire about the support rods 13 and joining the wire to the support rods 13 at displaced locations along the sides thereof by a cutting and swaging operation, as indicated at the positions 17. The operative portion of the grid electrode 16 thus formed comprises a plurality of parallel lateral grid wires 16', 16" . . . extending between the support rods 13 in a direction generally transverse to the path of electron flow, the path being generally normal to the major surface of the cathode 15'. In a similar fashion, a second grid electrode 18, formed on a pair of support rods 14 in a prior manufacturing step, is supported by the support rods 14. A helix of wire, here shown to be larger than that employed in forming the grid electrode 16, is wound about the support rods 14 and joined to the support rods 14 at displaced positions along the sides thereof by a cutting and swaging operation, as indicated at the positions 19, the displacement of the positions 19 being equal to that of the positions 17. The grid electrode 18 thus includes a plurality of lateral wires 18', 18" . . . extending between the support rods 14 in a direction generally transverse to the path of electron flow.

As shown in FIG. 1, the first pair of support rods 13 is positioned within the pair of apertures 9 in the support plate 6 and extends from the opposite or the top and bottom surfaces thereof. An end portion of each of the support rods 13 projects through the apertures 9 and beyond the bottom surface of the support plate 6 for reception within recesses 3 in the base member 1. The pair of recesses 3 maintains the support rods 13 vertically disposed relative to the support plate 6. Similarly, the second pair of support rods 14 is positioned within the second pair of apertures 10 in the support plate 6 and extends from the opposite, or the top and bottom surfaces thereof. An end portion of each of the support rods 14 projects through the apertures 10 and beyond the bottom surface of the support plate 6 for reception within the threaded apertures 4 in the base member 1. The guide 15, shown prior to positioning the cathode sleeve 15' (FIG. 2) thereover, is mounted within the recess 11 in the base member 1 and extends in a vertical direction upwardly through the aperture 12 in the support plate 6. Sufficient space is provided between the guide 15 and the walls of the recess 11 in the base member 1 and the aperture 12 in the support plate 6 whereby the cathode sleeve 15' may be slid over the guide 15 and inserted through the aperture 12 in the support plate 6 and into the recess 11.

To exert vertical pressure on the grid side rods 13 and 14, thereby to ensure proper seating of the lower ends thereof in the recesses 3 and 4, we employ a hold-down fixture 51 comprising a block of metal or other suitable material which is slidable in a vertical direction in a pair of grooves 53 provided in fixed supports 55. The fixture 51 is formed with two pairs of parallel bores 57 and 59 which are spaced in accordance with the relative spacing of the grid side rods 13 and 14. The bores 57 and 59 carry spring biased plungers 61, 63, respectively, which are suitably disposed in the bores and adapted to contact the free ends of the side rods 14 and 13 to exert vertical pressure thereon to hold the grids firmly in position in the recesses 3 and 4.

As noted earlier, it is essential for operation of the electron discharge device that corresponding lateral wires, such as the lateral wires 16' and 18' of the grid elements 16 and 18, respectively, be aligned with one another in a common alignment plane. This, of course, requires that the grid elements 16 and 18 be wound on their related support rods 13 and 14 at an equal or common pitch, which may be visualized as the angular relation of the common alignment plane A—A to the horizontal plane of the support plate 6. Further, the vertical displacement of the successive lateral wires 16', 16" . . . of the grid electrode 16 must be equal to the vertical displacement of the successive lateral wires 18', 18" . . . of the grid element 18. This latter requirement is satisfied by making the displacement of the positions 17 equal to the displacement of the positions 19.

Inasmuch as the support rods 13 are fixed in position relative to the base member 1 by their reception within the recesses 3, which have a fixed depth within the base member 1, the common alignment plane A—A may represent the intial position of a given lateral wire of the grid element 16, such as the lateral wires 16', relative to the horizontal plane of the support plate 6. To align the lateral wires of the grid 18, with those of grid 16, the screw members 5 are rotated in their threaded apertures by the respective knurled control knobs. Appropriate rotation of the control knobs varies the depth of the threaded apertures 4 and thus moves the support rods transverse to the support plate 6 to vary the vertical displacement of the support rods 14, whereby the axis of the lateral wire 18' is aligned with the common alignment plane A—A and concomitantly with the corresponding lateral wire 16' of the grid element 16. The use of two independent control knobs permits independent control of the vertical position of each one of the pair of support rods 14. It is apparent, however, that if the ends of the support rods 14 are precisely aligned in a horizontal plane, a single control for effecting merely a common vertical displacement of both of the support rods 14 may be employed in place of the two independent control knobs. In addition, the recesses 3 may be designed in an identical fashion to the threaded apertures 4 and employ identical associated screw members 5 whereby the depth thereof may be adjusted.

Following alignment of the grid electrodes 16 and 18, the support rods 13 and 14 are joined to the support plate 6 by the apparatus shown in FIGS. 2, 3, and 4. This apparatus comprises a first pair of opposed dies 20 and 21 positioned contiguous the top surface of the support plate 6 and a second pair of opposed dies 22 and 23 positioned contiguous the bottom surface of the support plate 6, the dies 22 and 23 being received within channel 330 provided therefor on the base member 1.

Referring to FIGS. 2 and 4, the die 20 includes mirror image portions 20a and 20b separated by a central portion 20c. U-shaped grooves 24 and 25 are provided in the die portions 20a and 20b thereby to define tapered lip portions 26, 27, and 28. The central portion 20c of the die 20 includes a large U-shapeod recess 29 for straddling the position occupied by cathode 15' (which has been positioned over the guide 15) at the central portion of the support plate 6.

The dies 20, 21, 22, and 23 may, if desired, be identical in construction. Using identical, but primed numbers to indicate portions of the die 21 which are identical to those of the die 20, the die 21 similarly includes U-shaped grooves 24' and 25', a large U-shaped recess 29', and tapered lip portions 26', 27' and 28'.

The dies 22 and 23 are mirror images of the respectively vertically displaced dies 20 and 21. Although the dies 22 and 23 are hidden substantially from view, in FIG. 2, the tapered lip portion 26a of the die 22, and the tapered lip portions 26a' and 27a' and the U-shaped recess 24a' of the die 23 are shown.

In the side view of FIG. 3, the dies 20 and 21 are shown in opposed relation about the support rods, of which only rod 14 can be seen, and contiguous the top surface of the support plate 6, and the dies 22 and 23 are shown in opposed relation about the support rods 13 and 14 and contiguous the bottom surface of the support plate 6 and within the channel 30 in the base member 1.

As shown more clearly in FIGS. 3 and 4, the dies 20, 22, and 21, 23 are similarly constructed and may be formed from integral blocks of suitable material which are machined or milled to provide tine-like cutting edges which are spaced apart by slots 71 and 73 a vertical distance sufficient to permit the support plate 6 to be interposed between the respective dies 20 and 22 and 21 and 23, respectively. The die blocks are further milled to provide a recess as at 75 and 77 to permit the dies to be reciprocated toward and away from the grid side rods in the channel 30 of base 1.

Reciprocation of the dies 20, 22 and 21, 23 is effected through a manually operable lever mechanism, which, as shown in FIG. 4, comprises a toggle 81 rotatably supported on a pivot 83 and having a centrally disposed hand bar 85. Linkages 87 and 89 are pivotally carried at the ends of toggle 81, the linkages 87, 89, in turn, being pivotally connected to bent levers 91 and 93, respectively. The latter are pivoted at points 95, 97 intermediate the ends of the levers 91, 93, with the relatively shorter lever arms of the respective levers being coupled to the die blocks as at 99, 101. It will thus be seen that movement of hand bar 85 in a clockwise direction about pivot 83 causes simultaneous movement of the die blocks toward each other an amount depending on the angular displacement of the bar 85. Movement of the hand bar in the opposite or counterclockwise direction causes simultaneous movement of the die blocks away from each other an amount depending on the displacement of the bar 85.

Returning now to FIG. 2, it will be understood that the support rods 13 and 14 and the associated grid electrodes 16 and 18 are secured to the support plate 6 by a deforming operation performed upon the support rods 13 and 14 by the dies 20 to 23. By movement of the hand bar 85 in a clockwise direction, the levers 91, 93 are actuated to move the opposed dies 20 to 23 to the closed position. In the closed position, the tapered lip portions 26 and 26' of the dies 20 and 21 engage and deform side portions of the side rods 14 to form integral projections 33 thereon. Similarly, tapered lip portions 27 and 27' form integral projections 34 on support rods 14. Likewise, integral projections 35 and 36 are formed on the support rods 13 by the tapered lip portions 27 and 27' and the tapered lip portions 28 and 28', respectively. Preferably, the integral projections 34 and 36 are diametrically opposed to the integral projections 33 and 35, respectively. Due to the recessed portions 24 and 25 and the opposed recessed portions 24' and 25' on the dies 20 and 21, respectively, central portions 37 and 38 of the support rods 13 and 14, respectively, are substantially unaffected by the deforming operation.

As previously discussed, the dies 22 and 23 are identical in structure to the dies 20 and 21 and positioned in respective minor relationship thereto. Thus, in the closed position, the dies 22 and 23 engage and deform the support rods 13 and 14 at diametrically disposed positions thereof contiguous the bottom surfaces of the support plate 6. Thus, tapered end portions 26a and 26a' engage and deform the support rod 14 to form integral projection 33a. Integral projection 34a on support rod 14 and integral projection 35a on support rod 13 are formed in a similar fashion. From FIG. 5 it is clear that the dies 22 and 23 form a complete set of integral projections 33a–36a on the support rods 13 and 14 contiguous the bottom surface of the support plate 6 in a minor relation to the set of integral projections 33–36 formed on the support rods 13 and 14 contiguous the top surface of the support plate 6 by the dies 20 and 21.

The manner in which the integral projections on the support rods 13 and 14 securely mount the support rods 13 and 14 to the support plate 6 can be appreciated more completely by reference to FIG. 2. The integral projections 35 and 35a on support rod 13 are shown in the immediate vicinity of the cut-away portion of the support plate 6, and are seen to be axially aligned and respectively contiguous the top and the bottom surfaces of the support plate 6, thereby securely mounting support rod 13 on the support plate 6. In addition to the portions 37 and 38 left unaffected during the foregoing operation, generally circular portions 39 and 40 on the support rods 13 and 14, respectively, having a thickness in the axial direction equal to the thickness of the support plate 6, will be partially unaffected by the deforming operation. However, the flow of the metal of the support rods 13 and 14 in forming the various integral projections 33–36 and 33a–36a tends to expand the material of the support rods intermediate the aligned integral projections 33–36 and 33a–36a at the regions 41 and 42 on support rod 13 and the regions 43 and 44 on support rod 14. The expansion of the metal at the regions 41–44 provides an additional interlocking of the support rods 13 and 14 to the support plate 6 by tightly wedging the support rods 13 and 14 within the apertures 9 and 10, respectively.

In FIG. 5, a second support plate 6′ is shown provided at the opposite extremity of the support rods 13 and 14 and is positioned in parallel relation to the support plate 6. Indicating elements of the support plate 6′ which are identical to those of the support plate 6 by primed and otherwise identical members, the support rods 13 and 14 extend freely through the apertures 9′ and 10′, respectively, in the support plate 6′. Likewise, the cathode 15′ extends through the aperture 12′ in the support plate 6′.

An anode, not shown herein for purposes of clarity, extends between and is attached to both the support plates 6 and 6′ for completing the electrode structure of the electron discharge device. In a subsequent operation, the entire electrode structure is suitably mounted on the base of an electron discharge device housing and electrical interconnections are provided between the electrodes and external terminals prior to sealing of the completed electrode structure within the evacuated housing of the device.

Since the upper ends of the support rods 13 and 14 pass freely through the apertures 9′ and 10′, respectively, the support rods 13 and 14 are free to expand axially upon heating during fabrication and normal operation of the device. Thus, the grid elements 16 and 18 may expand freely with the respectively associated support rods 13 and 14; since the expansion occurs without constriction, the grid electrodes 16 and 18 expand without distortion and the precise alignment of the corresponding lateral wires is maintained. Similarly, upon cooling of the device, the support rods 13 and 14 contract freely and without constriction or distortion.

Although the invention has been described in relation to the manufacture of an aligned-grids electron discharge device employing frame or wound grid electrodes, it is apparent that the invention is equally applicable to electron discharge devices employing any type of grid electrodes having lateral wires or conductors required to be aligned and support rods which are to be joined to a support plate. Further, the number of grid electrodes which may be aligned and mounted in accordance with this invention is not limited to that of the embodiment shown and described. In addition, the disposition of the various elements has been described with regard to horizontal and vertical planes for clarity of description and by no manner in a limiting or restrictive sense.

Many modifications of the method, the apparatus, and the structure of this invention readily will be apparent to those skilled in the art and thus it is intended by the appended claims to cover all such modifications and adaptations which fall within the true spirit and scope of this invention.

What I claim and desire to be secured by Letters Patent of the United States is:

1. In a device for aligning and mounting the plural grid electrodes of an aligned-grids electron discharge device wherein each of the grid electrodes has a plurality of lateral wires extending between oppositely disposed support rods and the support rods are positioned with an end portion thereof extending through apertures provided therefor in a support plate, said device comprising:
  (a) a base member for receiving on the surface thereof the support plate, said base member having recesses therein for reception of the end portions of the support rods, the recesses receiving the end portions of the support rods of one of said grid electrodes being of variable depth,
  (b) adjustment means for varying the depth of said recesses of variable depth to position the lateral wires of the second grid electrode in a common alignment plane with the corresponding lateral wires of the first grid electrode, and
  (c) deforming means for engaging all the support rods at positions contiguous the opposite surfaces of the support plate to form integral projections on the support rods overlying the opposite surfaces of the support plate to mount the grid electrodes on the support plate.

2. In a device for aligning and mounting the plural grid electrodes of an aligned-grids electron discharge device as recited in claim 1 wherein said deforming means comprises:
  (a) a first pair of die members positioned adjacent one surface of said support plate and a second pair of die members positioned adjacent the opposite surface of said support plate, said first and said second pairs of die members being arranged in opposed relation about the support rods and movable between open and closed positions, and
  (b) actuating means for simultaneously moving both of said pairs of die members selectively to said closed position to engage said support rods for forming said integral projections on said support rods and for moving both of said pairs of die members to said open position to disengage said support rods.

3. In a device for aligning and mounting the plural grid electrodes of an aligned-grids electron discharge device wherein each of the grid electrodes has a plurality of lateral wires extending between oppositely disposed support rods and the support rods are positioned with an end portion thereof extending through apertures provided therefor in a support plate, said device comprising:
  (a) a base member having a horizontal mounting surface for receiving said support plate thereon, said base member having vertically disposed recesses extending to a predetermined depth therein from said mounting surface for reception of the end portions of the support rods of a first grid electrode and having vertically disposed threaded apertures extending therethrough from said mounting surface for reception of the end portions of the support rods of a second grid electrode,
  (b) screw means received within said threaded apertures and adjustable to vary the depth of said threaded apertures for vertically displacing the second grid electrode to position the lateral wires of the second grid electrode in a common alignment plane with the corresponding lateral wires of the first grid electrode, and (c) deforming means for engaging all the support rods at positions contiguous the opposite sides of the support plate to form integral projections on the support rods overlying the opposite surfaces of the support plate to mount the grid electrodes on the support plate.

References Cited

UNITED STATES PATENTS

| | | | |
|---|---|---|---|
| 1,562,396 | 11/1925 | Ward | 313—292 |
| 3,068,825 | 12/1962 | Knauf et al. | 269—40 |
| 3,094,957 | 6/1963 | Knauf | 29—25.19 XR |
| 3,097,621 | 7/1963 | Lalak | 269—40 |
| 3,137,061 | 6/1964 | Lalak | 29—25.19 XR |

CHARLIE T. MOON, *Primary Examiner.*

RICHARD B. LAZARUS, *Assistant Examiner.*

U.S. Cl. X.R.

248—188.4; 254—98